United States Patent [19]

Binder et al.

[11] 3,915,914

[45] Oct. 28, 1975

[54] ASPHALT COMPOSITIONS CONTAINING POLY-1-BUTENE AND METHODS FOR PREPARING

[75] Inventors: Gerhard Binder; Fritz Baxmann; Albert Frese, all of Marl, Germany

[73] Assignee: Chemische Werke Huls Aktiengesellschaft, Germany

[22] Filed: Aug. 30, 1971

[21] Appl. No.: 176,162

[30] Foreign Application Priority Data

Sept. 4, 1970 Germany............................ 2043864

[52] U.S. Cl...... 260/28.5 AS; 260/28.5 A; 428/489; 428/500
[51] Int. Cl.²......................................... C08L 95/00
[58] Field of Search............... 260/28.5 AS, 28.5 A; 428/489, 500

[56] References Cited

UNITED STATES PATENTS

| 3,303,151 | 2/1967 | Peters et al.................. 260/28.5 AS |
| 3,336,252 | 8/1967 | Raichle et al................ 260/28.5 AS |
| 3,338,855 | 8/1967 | Kray ............................. 260/28.5 A |

FOREIGN PATENTS OR APPLICATIONS 6,715,512  5/1968  Netherlands

Primary Examiner—Melvyn I. Marquis
Attorney, Agent, or Firm—Gilbert L. Wells

[57] ABSTRACT

Thermoplastic compositions of asphalt and poly-1-butene dissolved therein containing more than 50 to less than 95 percent by weight of asphalt and less than 50 to more than 5 percent by weight of poly-1-butene.

5 Claims, 12 Drawing Figures

ASPHALT COMPOSITIONS CONTAINING POLY-1-BUTENE AND METHODS FOR PREPARING

CROSS-REFERENCE TO A RELATED APPLICATION

Applicants claim priority under 35 U.S.C. 119 for Application Serial No. P 20 43 864.6, filed Sept. 4, 1970 in the Patent Office of the Federal Republic of Germany.

BACKGROUND OF THE INVENTION

The field of the invention is compositions, coating or plastic, containing bituminous material or tarry residue. The invention is particularly concerned with thermoplastic compositions of asphalt and poly-1-butene dissolved therein for use as binders for construction of road surfaces and as sealing films.

The state of the art of asphalt compositions may be ascertained by reference to the Kirk-Othmer "Encyclopedia of Chemical Technology," 2nd Edition, Vol. 2 (1963), pp. 762–806 under the section "Asphalt," particularly pp. 784–789 for compositions thereof, pp. 789–793 for test procedures, and 793–797 for asphalt properties and uses. The state of the art of poly-1-butene may be ascertained by reference to Kirk-Othmer ibid, Vol. 3, (1964), pp. 830–865, and Vol. 14 (1967), pp. 217–313.

The state of the art of mixing polyolefins with asphalt may be ascertained by reference to French Pat. No. 1,527,402, German Published Application No. 1,301,141, unexamined German Published Application No. 1,469,971, U.S. Pat. Nos. 3,070,557 and 3,070,568 of Gessler et al which issued Dec. 25, 1962, and Dutch Published Application No. 6,715,512 of Ethylene-Plastique which is based upon the priority of U.S. Application Ser. No. 594,670, filed Nov. 16, 1966, and now abandoned.

As is known, asphalt compositions are employed technically to a large extent, thus, for example, they are used as binders in road construction, as impregnating agents and toppings for roofing board, as heat-sealing agents, as heat-curing paint, and as pipe coating agents.

The asphalt masses (bitumens, tars, and pitches) are restricted by natural limits. For example, in the case of distillation bitumens, the plastic temperature range according to German Industrial Standard DIN 1995, determined from the difference between the breaking point (according to Fraass) and the softening point (ring and ball), is maximally about 70°C. The breaking point is satisfactory only in the case of very soft bitmens (B 300: −20°C). In the case of tougher types (B 15: +3°C), the breaking point ranges above 0°C.

Therefore, the presently existing types of asphalt according to DIN 1995 are no longer satisfactory. In hot summers, a considerable portion of the prior art asphalt road surfaces are destroyed. In order to avoid damage, in the wintertime, to the road surfaces which are undercooled by thawing salts, soft asphalts having low breaking points are used and these asphalts can become irreversibly deformed during the summertime.

With high vacuum asphalts, the softening point reaches 130°–140°C; however, the breaking point of these asphalts is far above 0°C. These types also exhibit a very low ductility, which limits their application in practice.

Blown asphalts exhibit plastic temperature ranges with a maximum of 120° – 130°C. The breaking point of the types of high thermal stability (B115/15) is favorable, at −10°C, but yet does not satisfy many requirements. Furthermore, the ductility is low, and the weathering resistance is insufficient for outdoor exposure due to brittleness.

The processing of asphalt requires specific viscosities as present, for high quality asphaltic concrete, in B 300, B 2000, B 80, and B 65, and for mastic asphalt in B 65 to B 15 as measured according to the test of DIN 1995, wherein the number defines the penetration. Similar requirements regarding the viscosity, ensuing from the production, exist in practically all applications of asphalt. When improving the asphalt with respect to the softening point and the breaking point, it is necessary to maintain the viscosities so that the processability is impaired as little as possible.

The adhesion exhibited by the asphalt with respect to contacting or imbedded substances is not always sufficient. The resistance of the asphaltic masses to chemicals, such as solvents and oxidants is not always satisfactory, either. Furthermore, under the perpetual effect of heat above the softening temperatures, for example during transport, asphaltic compositions are considerably altered or damaged.

Therefore, there is an urgent need for developing thermoplastic asphaltic compositions exhibiting an increased softening range and reduced cold flow, but yet a lower temperature brittleness range, i.e., a broadened plastic temperature range.

In this connection, the increase in viscosity due to additives during the processing and transportation is to be as minor as possible; at the same time, good weatherability, uniform properties under long term effects of temperature during transport and processing, and good adhesion to contacting surfaces or imbedded substances are required. The demands regarding hardness differ. For some kinds of applications, high softening points are desired, connected with a relatively low hardness indentation according to DIN 1995; for other purposes, e.g. for road construction, a large plastic temperature range is demanded, connected with as low a penetration depth as possible. The compositions to be developed are to exhibit, at the temperatures of use, no blooming phenomena, and, if possible, no surface tackiness. It would also be advantageous if these compositions could be processed, thermoplastically, into sheets and profiled articles, or shaped components. Some consumers also prefer to use granulated asphalt as their starting material for further processing.

Any components which may be added thereto are to be economically producible in a large scale technical procedure, and are to be readily incorporable, if necessary by the use of powders, crumbs, convenient pieces, or batches. They are to impart a good effect in small amounts, but, if necessary, are also to be admixable in larger amounts in order to obtain correspondingly large scale effects. Variations in the asphalt or the additives due to their manufacture should have as low an influence as possible on the admixability and on the quality of the finished product.

It has been suggested by the prior art to add rubber or natural rubber compositions. Tire reclaim rubbers are of little use, since the vulcanized mass is merely embedded and is not dissolved in the heated asphalt.

Although pulverized natural rubber is dissolved and increases the softening point while reducing the low temperature brittleness, the heat stability and the light stability are insufficient. Also, the rubber must contain about 40 percent of fillers in order to remain in the pulverized state. Furthermore, the solubility is limited so that only 3 – 5 percent of rubber is added. Synthetic rubbers exhibit similar behavior.

Rubber latex produces difficulties during the admixing step, since, upon introduction of the emulsion into the hot mixing substance, the water evaporates in a flash-like manner and thus the mixture begins to foam, or bubbles are included therein. Uncontrolled gelling can impair the homogeneity of the mixtures. The cooling effect exerted by the evaporating water on the mixing composition reaches 5° – 10°C.

Among the individual rubbers, polychloroprene exhibits the highest improvement and best non-aging properties in mixtures with asphalt, whereas nitrile rubber exhibits the lowest values for such properties. The conditions which, in total, are unsatisfactory, are illustrated herein with reference to various rubber types ("Bitumen, Teere, Asphalte, Peche" [Bitumens, Tars, Asphalts, Pitches] 1966, Vol. 9) addition per 3 percent of solid substance. The parenthetical values were measured after aging (ASTAM D 1754; 5 hours, 163°C).

cient solubility. Therefore, they are offered exclusively in the form of 50 percent asphaltic batches. These batches exhibit a relatively good effect. However, their use is not without problems, since the viscosity of these batches is very high, and since the dissolution rate is low. The melt viscosity requires processing temperatures of 220°C to a maximum of 250°C. (Kunststoffe" [Plastics] 59 (1969), 111–113). The batch cannot be incorporated into a paving composition in the form delivered by the supplier; rather, it must first be melted separately. The production of the copolymer from several components is obviously expensive from a technical viewpoint. Furthermore, the 50 percent batch still does not appear to be entirely homogeneous, which manifests itself in the blooming of the asphalt to the surface and in a marked tackiness of the finished products. These deficiencies are to be overcome, according to DAS 1,301,141, by homogenizing additives of polyisobutylene or butadiene copolymers.

Polysiobutylene does not result in stable mixtures. There is a tendency toward cold flow. Polyisobutylene having relatively low molecular weights can readily be incorporated, but do not increase the softening point, but rather have the effect of plasticizers. Other polyisobutylenes having a high molecular weight, though exhibiting an improved effect, can be incorporated only

|  | Penetration (25°C) Before (After) Aging | Softening Point Before (After) Aging | Ductility 4°C Before (After) Aging |
|---|---|---|---|
| B 80 without additives | 88 (55) | 45 (51) | 19 (3) |
| 3% Polychloroprene (from latex) | 75 (70) | 51 (52) | 55 (55) |
| 5% Natural rubber, pulverized | 61 (57) | 55 (54) | 10 (9) |
| 3% Natural rubber (from latex) | 90 (33) | 60 (52) | 25 (13) |
| 3% Natural rubber | 81 (65) | 50 (47) | 40 (17) |
| 3% Polyethylene vinyl acetate | 92 (38) | 55 (60) | 28 (8) |
| 3% Butyl rubber | 98 (85) | 51 (43) | 19 (17) |
| 3% Nitrile rubber | 72 (50) | 50 (50) | 14 (20) |

However, the addition of thermoplastic synthetic resins has also been suggested. Polyvinyl chloride dissolves homogeneously in asphalt only up to about 5 percent, and provides only minor improvements. Also polyethylene results in homogeneous mixtures only to an extent of 5 percent content; moreover, the synthetic resin crystallizes out upon cooling and is noticeable as a microscopic inhomogeneity. In German Published Application DAS 1,301,141, the assertion is made that polyolefins, such as polyethylene, can be mixed with asphalt in any desired quantitative ratios. Contradictory to this disclosure is German Published Application, Unexamined DOS 1,469,971, and the corresponding U.S. Pat. Nos. 3,070,557 and 3,070,568, wherein it is set forth that it is a remarkable fact that, although various plastic materials, oils, and other plasticizers can be mechanically mixed with polyethylene, only steam-cracked petroleum resins are actually soluble therein. In order to improve the solubility, it is recommended that a polymer mixture of polyethylene and vinyl acetate be added. However, as disclosed in DAS 1,301,141, the non-aging properties of these compositions are not yet satisfactory. Also the cold stability of these substances is still insufficient. Copolymers of ethylene and acrylates are too viscous and exhibit insuffiwith extreme difficulties. At temperatures of above 160°C, desegregation occurs.

Further, polypropylene which is atactic up to 20 percent has been added to asphalt heretofore. However, the polymer is not well dissolved in hot asphalt, especially in the case where low amounts are added. At high temperatures, it has a creaming effect, whereas the composition becomes grainy and inhomogeneous during cooling. In the case where large amounts are added, the solubility is improved. Yet, an atactic polypropylene having an RSV (Reduced Specific Viscosity) of 0.7 according to the formula $$\frac{\frac{\eta}{\eta o} - 1}{c}$$

and 67 percent ether extractable imparts only a moderate improvement to a primary asphalt B 200, especially in the case of low concentrations, as demonstrated hereinbelow without considering homogeneity:

| Concentration Atactic polypropylene (%) | Softening Point (°C) | Breaking Point (°C) | Penetration (1/10 mm.) | Ductility (cm.) | Plastic temperature Range (Degrees) |
|---|---|---|---|---|---|
| 0 | 39 | −18 | 160 | >100 | 57 |
| 3 | 44 | −19 | 95 | 40 | 63 |
| 5 | 45 | −19 | 80 | 25 | 64 |
| 10 | 51 | −21 | 60 | 13 | 72 |
| 20 | 62 | −23 | 37 | 6 | 85 |

$* \dfrac{\frac{\eta}{\eta o} - 1}{C} = RSV$, wherein $C$ = concentration (0.1 g polymer in 100 cm$^3$ decahydronaphthalene; $\eta$ = viscosity of this solution, $\eta O$ = viscosity of decahydronaphthalene; temperature = 135°C Also the heat stability over long periods exhibited by such mixtures is limited.

Therefore, the general findings have been heretofore that a substance readily incorporable into bitumen brings only minor improvements, whereas great improvements are obtained only from those substances which are difficult to incorporate.

Although French Pat. No. 1,527,402 describes mixtures of asphalt, mineral oil, and polybutene, the purpose of these additives is, rather, to increase the viscosity. As can be seen from a comparison with the company leaflet "OPPANOL B" (publication of BASF [1967], pp. 39 and 40), the compound involved is doubtlessly polyisobutylene.

Although Dutch Published Application No. 6,715,512 of Ethylene-Plastique, based on U.S. application Ser. No. 594,670, filed Nov. 16, 1966, and now abandoned, defines asphaltic mixtures with 5 – 95 percent poly-1-butene, this publication teaches exclusively that such mixtures consisting of 5 to at most 50 percent bitumen are particularly strong, flexible, oil-resistant, and deformable. Nothing is set forth therein regarding the broadening of the plastic range, particularly with mixtures which consist of 50 – 95 parts of asphalt and 50 – 5 parts of polybutene. Also, no fields of application are mentioned which are also based on these properties, and nothing is said about technically advantageous methods for the production of the mixtures.

Consequently, there is still a need for thermoplastic compositions based on asphalt which, on the one hand, exhibit the required, essentially improved properties, but, on the other hand, can be obtained without encountering any problems from a technical and economical viewpoint.

SUMMARY OF THE INVENTION

Having in mind the limitations of the prior art, it is an object of the present invention to provide a composition consisting of more than 50 percent by weight to less than 95 percent by weight of asphalt and less than about 50 percent by weight to more than about 5 percent by weight of poly-1-butene. Especially good effects are attained when adding about 5 – 40 percent by weight of polybutene and the highest degree of effectiveness of the poly-1-butene ranges between about 5 and 30 percent by weight.

Asphalts are represented by the dark brown to black, tacky-viscous to brittle-hard, meltable hydrocarbon mixtures obtained during the processing of petroleums, or those which occur in natural asphalt, e.g. in Trinidad pitch, as the soluble, meltable component. The softening points of these compositions range between +25°C and +180°C (DIN 1995, ring and ball), the breaking points range between −25°C to above room temperature (DIN 1995, Fraass method), and the penetration depth is between 400 and 2/10 mm. (DIN 1995). Also mixtures of asphalt with oils, e.g. tar oils, in so-called bituminous blends are improved by the additives described herein.

Poly-1-butene is understood to mean polymers of 1-butene or copolymers or terpolymers of 1-butene with other monomers, especially with other olefins of 2 – 20 carbon atoms, as they are catalytically produced in the liquid phase with or without the presence of inert solvents or in the gaseous phase, especially in accordance with the low pressure method of Ziegler, for example by the polymerization of 1-butene with $TiCl_4$, $TiCl_3$, $VOCl_3$, or $VCl_4$ catalysts activated with alkylaluminum compounds, such as, for example $Al(C_2H_5)_3$ or $Al(C_2H_5)_2 CZ$, at temperatures of 0°C to 200°C, particularly 25° – 150°C, pressures of 0 – 50 atmospheres gauge, and within a period of 5 – 15 hours. The state of the art of 1-butene and its polymerization to poly-1-butene may be ascertained by reference to Kirk-Othmer "Encyclopedia of Chemical Technology," 2nd Ed., Vol. 3 (1964), pp. 830–865, particularly pp. 832–833 and 846–855, and Vol. 14 (1967), pp. 217–313, particularly pp. 309–313. In Vol. 3 the nomenclature and physical properties of 1-butene are disclosed on page 832, and the polymerization reactions are disclosed on page 846. Vol. 14 discloses at pages 309–313, the state of the art of poly-1-butene.

The working-up operation is conducted with alcohols, especially methanol, and/or water. Polybutenes having a high atactic proportion are preferably worked up by effecting the decomposition with $C_1$ to $C_4$ alcohols at 10° – 40°C, and the drying step at below 60°C. Among this group are waxy-tacky and horn-like solid substances having molecular weights of between 40,000 and 4 million, with differing crystallinity, which latter manifests itself in the crude densities of between 0.85 and 0.93 and in ether extracts of between 0 and 90 percent. The crystalline proportion can be present in modifications 1, 1$^1$, 2 and 3. Suitable copolymers contain, for example, up to 50 percent by weight of ethene, propene, pentene, hexene, dodecene, octadecene, or 1,7-octadiene, based on the copolymer or the termpolymer. For the additive, suitable are not only the pure homo- and/or co- or terpolymers, but also mixtures with other polymers, such as polyolefins or rubbers, with asphaltic or oily substances, as well as mixtures obtained by polymerization in oily or asphaltic products.

Preferably, the asphalt has softening points of between 25° and 90°C (DIN 1995, ring and ball) and penetration depths of between 350 and 10 tenths of a millimeter. The asphalts involved can be either primary asphalts as well as blown asphalts. The blown effect can also be imparted during the mixing procedure or after the polybutene has been added. Especially good effects are obtained with the use of primary asphalt having softening points of between 25° and 70°C and indentation depths of between 350 and 15 tenths of a millimeter.

The poly-1-butene is preferably a polymer having molecular weights of between 50,000 and 3.5 million, with mass densities of between 0.85 and 0.92 and ether extracts of between 0.5 and 85 percent. The most advantageous mixtures can be obtained with molecular weights of between 80,000 and 3 million, mass densities of between 0.88 and 0.91, and ether extracts of between 20 and 80 percent. The highest efficacy in the widening of the plastic temperature range is attained by products having molecular weights of between 150,000 and 2.5 million and ether extracts of between 2.5 and 60 percent.

In all cases still to be described, the poly-1-butene can also consist of various polybutene compositions which are added simultaneously or also at different times. For example, the dissolution process can be accelerated and the homogeneity can be still further improved by admixing, in place of 45 percent of a high molecular isotactic polybutene, only 30 percent of this last-mentioned polybutene and 15 percent of a higher atactic type.

Also the addition of further synthetic resins, such as polyethylene, isotactic as well as atactic polypropylene, or the addition of rubbers, such as styrene-butadiene rubber, natural rubber, polychloroprene, or ethylene-propylene rubber, is possible, and does not restrict the use of poly-1-butene. This is also true for all conventional additives, such as flux oils, natural asphalt, tar oils, tar pitches, colophony, linseed oil, epoxies, etc. All of these substances can partially replace a portion of the asphalt in the mixtures with polybutene; the amount of poly-1-butene remains within the claimed limits. Depending on the type of additives, they can be used in a great variety of quantities (Example 9).

Surprisingly, poly-1-butene can be mixed readily in a very wide range of crystallinity and molecular weight into asphaltic compositions, in all concentrations of between 5 and 50 percent (based on the organic component of the entire mixture). Neither inhomogeneities nor non-mixing is observed. Only in the case of poly-1-butenes having a very high molecular weight and a simultaneously high crystallinity, it is substantially more difficult to obtain homogeneous mixtures at concentrations of between about 10 and 25 percent by weight of polybutene. These products cannot be admixed very readily and very quickly, either. However, the effort to be expended to mix same is within the scope normally required for the mixing of synthetic resins or rubbers.

The origin of the asphalt within a certain type according to DIN 1995 and thus the content of aliphatic, naphthenic, and aromatic components therein has only a minor influence on the solubility of the poly-1-butene. The polybutenes employed exhibit the following properties:

| Ether Extract Range (%) | R S V | | | | | | |
|---|---|---|---|---|---|---|---|
| 0 – 10 | 0.3 | 1.3 | 2.0 | 2.5 | 3.7 | 4.0 | 6.0 |
| 10 – 20 | 0.7 | 1.0 | 2.3 | 5.4 | | | |
| 20 – 30 | 3.8 | | | | | | |
| 30 – 40 | 1.3 | 4.0 | | | | | |
| 40 – 50 | 3.5 | | | | | | |
| 50 – 60 | 0.8 | 0.9 | 1.4 | | | | |
| 60 – 70 | 0.6 | 1.4 | 1.5 | 1.7 | | | |
| 70 – 80 | 0.6 | 0.8 | 0.9 | 1.0 | 1.2 | 1.3 | 3.5 |
| 80 – 90 | 1.4 | | | | | | |

The types of asphalts employed are:
primary asphalts — B 300, B 200, B 80, B 65, B 45, B 25, B 15
high vacuum asphalts — HVB 85/95; HVB 95/105; HVB 130/140
blown asphalts — 75/30; 85/40; 105/15; 115/15; 135/10
Blended asphalts — VB 100; VB 500

Preferably employed mixing ratios:

| Poly-1-butene | Asphalt |
|---|---|
| 5 | 95 |
| 10 | 90 |
| 20 | 80 |
| 25 | 75 |
| 45 | 55 |

The compositions of this invention are produced by mixing asphalt and poly-1-butene in the molten condition with agitation. The two substances can be melted in any desired manner: they can be melted simultaneously or successively, separately or together. It has been found advantageous to introduce the still cold polybutene at about 150°C into the molten asphalt and to heat the mixture further with agitation, until both substances have been melted and the mixture is homogeneous. Suitably, the additives are also incorporated in the pulverized state. In the case of the exceedingly soluble types, it is also possible to incorporate lumps having a weight of 200–400 g., with the mixing times being only slightly increased thereby. Especially in the case of higher poly-1-butene concentrations, the use of bales having weights of 5–50 kg. is also possible; however, the mixing times are lengthened thereby.

The mixtures especially with lower concentrations of poly-1-butene, can also be produced with the aid of concentrates of a large amount of polybutene in a small quantity of asphalt.

The dissolution velocity of poly-1-butene in asphalt is dependent on various parameters, as follows:

| If: | The Dissolution Rate Is: | |
|---|---|---|
| | Lower | Higher |
| Temperature | Lower | Higher |
| Agitation speed | Lower | Higher |
| Type of asphalt | high softening point | low softening point |
| Poly-1-butene particle size | large | small |
| Poly-1-butene ether extract | minor | high |
| Poly-1-butene RSV | high | low |
| Poly-1-butene concentration | Higher | lower |

The first four lines of the above Table are easily understood. The crystallinity and the molecular weight are in a complicated, in part additive, interaction. Values therefor cannot be given in the form of generalized data, but must be individually determined in dependence on the other parameters. It is advantageous for the selected material to adapt the temperature and agitation rate to the other technical data.

BRIEF DESCRIPTION OF THE DRAWINGS

The new and unexpected results of the present invention may be ascertained by reference to the drawings appended hereto, wherein.

DESCRIPTION OF THE PREFERRED EMBODIMENTS

Figure 1:
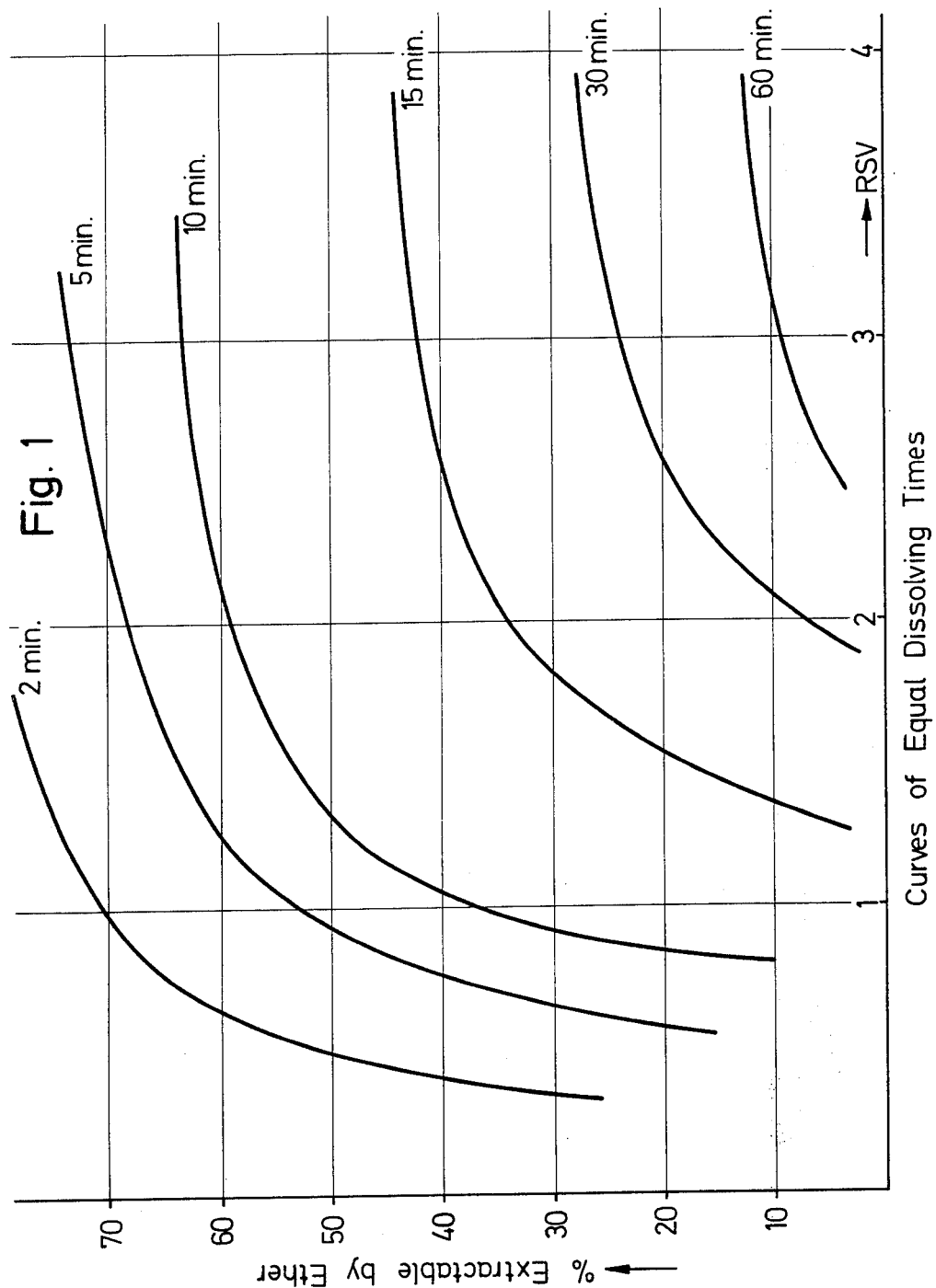
FIG. 1 is a graphical representation showing the curves of equal dissolving times in minutes plotted with the coordinates of the percentage of ether extractable material versus the reduced specific viscosity RSV.

In order to provide an example, FIG. 1 illustrates "curves of equal dissolving times" (minutes) in dependence on the ether extract and the RSV. The values were determined on 5.5 percent solutions of poly-1-butene in particles of a weight of about 0.1 g. at 165°C in bitumen 200. The curves indicate the periods of time after which no non-homogeneities can be detected.

The types having the low dissolution times of less than 2 minutes are dissolved within seconds, as soon as their melting temperature has been exceeded.

The high crystalline, high molecular types of poly-1-butene can, in principle, be admixed in the same manner as set forth above, in amounts of below 10 percent, except that suitably high intensity mixing processes are employed, such as high speed mixing machines. According to the invention, for admixing more than 25 percent of these types of polybutene, the polybutene is first melted, and asphalt is added thereto in small portions. Each portion of asphalt must be homogeneously incorporated before the subsequent portion is added. For purposes of incorporation, kneaders or the like are suitably employed and the temperature is to be above 200°C. Conversely, if asphalt is employed as the starting point and polybutene is added thereto, one must expect that the polybutene forms lumps, and that difficulties are encountered during the homogenization. This results in longer mixing times; besides, the asphalt must withstand a higher thermal load.

Surprisingly, still another mode of operation is successful: the high molecular, highly crystalline poly-1-butene is homogeneously distributed in the form of a powder in moderately warm asphalt. This can be accomplished, for example, with 40 parts of powder in 60 parts of B 300 at a mixing temperature of 50°–60°C. A pourable, slightly tacky powder is obtained in this manner. This powder can be heated to about 200°C with or without agitation, and results in a viscous, homogeneous melt.

The homogeneous powder can be produced even more easily by additionally admixing to the asphalt solvents which are suitable for expanding the polybutene. In this mode of operation, a loose, powdery, slightly tacky mass is very readily and quickly obtained, which mass can either be processed into a melt after the solvent has been removed, or which results in porous, foam-like bodies when heated in a mold.

The slightly soluble types of poly-1-butene result in the largest changes in the breaking point. The largest variations in the softening point, the penetration, and the ductility, however, are caused by the types having the longest dissolution times. This is a favorable attribute, though, with respect to the fields of applications since, for example, in road construction where the mixing times are brief, the breaking point is of decisive importance whereas the softening point can be set by the suitable selection of the asphalt. In contrast thereto, for use as a film, the high softening point is of importance, whereas more time is available for the production of the mixture.

The more time required for admixing the various types, the less tacky are the mixtures. Thus, a mixture of 52 parts of B 200 and 48 parts of atactic poly-1-butene with a 5 percent ether-soluble proportion and an RSV of 4 is still tack-free even at temperatures of 60°C. With 52 percent ether-soluble component and $RSV = 0.9$, this mixture is no longer tacky at room temperature, but the mixture having 64 percent of ether-soluble proportion and an RSV of 0.6 is still tacky at room temperature. The tackiness of the mixtures, however, has nothing to do with blooming phenomena. All of these mixtures are entirely homogeneous.

In addition to the surprisingly simple manner in which the mixtures can be produced, it was also found that the plastic temperature range of the mixtures, i.e., the interval between the softening point and the breaking point of the mixtures, is not improved in accordance with the ratio of the components, but rather is considerably above the additive values.

Figure 2:
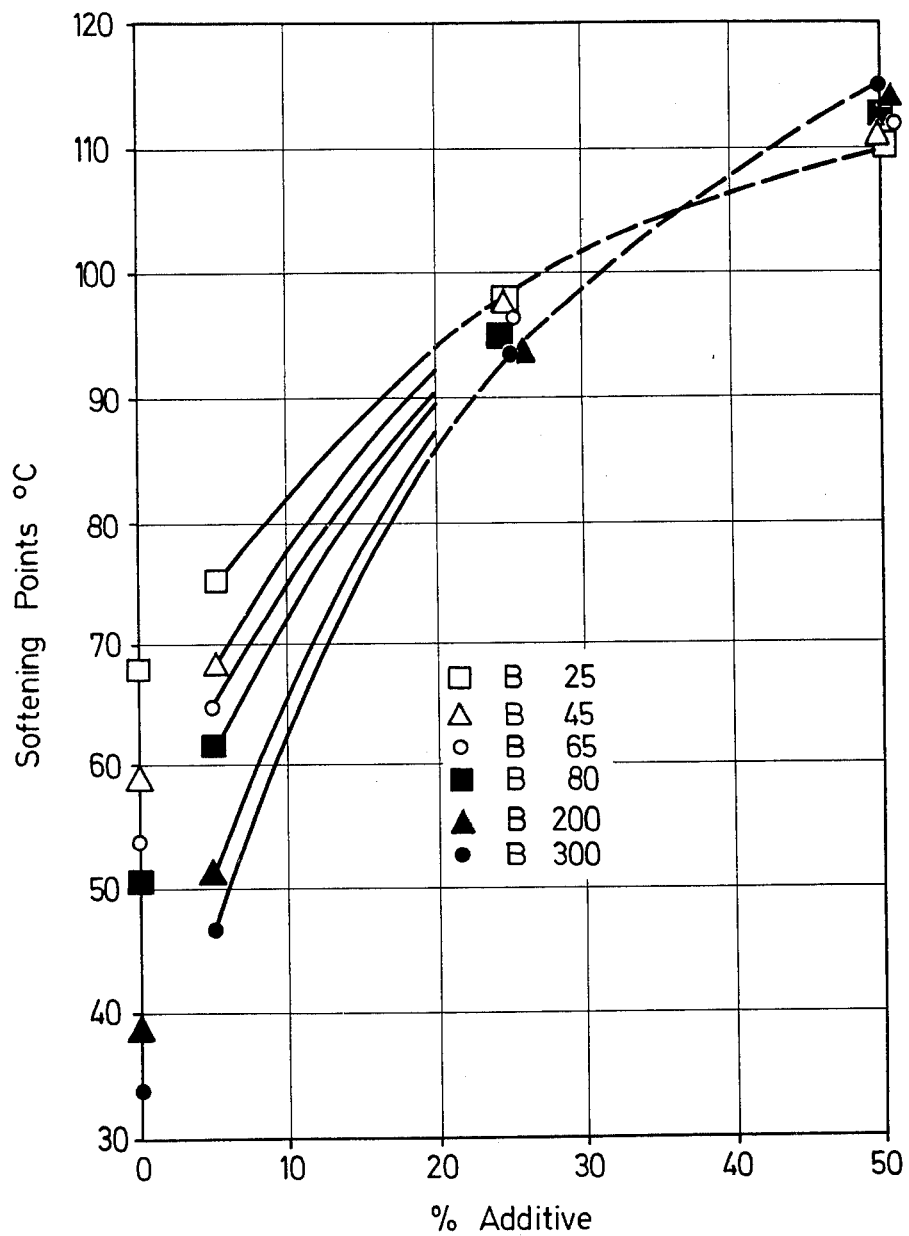
FIG. 2 is a graphical representation showing the increase in the softening points versus the percentage of additive for commercially available asphalts.

FIG. 2 shows the increase in the softening points of commercially available asphalts when adding a poly-1-butene with 52 percent ether extract and an RSV of 0.9. This increase is particularly strong in the lower concentration range. In the case of soft asphalts, this increase is higher than in the case of hard asphalts. The increase in the softening point is, for example, with 25 percent of the above-mentioned poly-1-butene to asphalt B 300, 60°, i.e., about 2.5° percent additive. When adding about 50 percent to B 300, the softening point is about 115°C and thus about 15° higher than that of the starting polybutene and about 80° higher than that of the starting asphalt (all measurements in accordance with DIN 1995, ring and ball).

Figure 3:
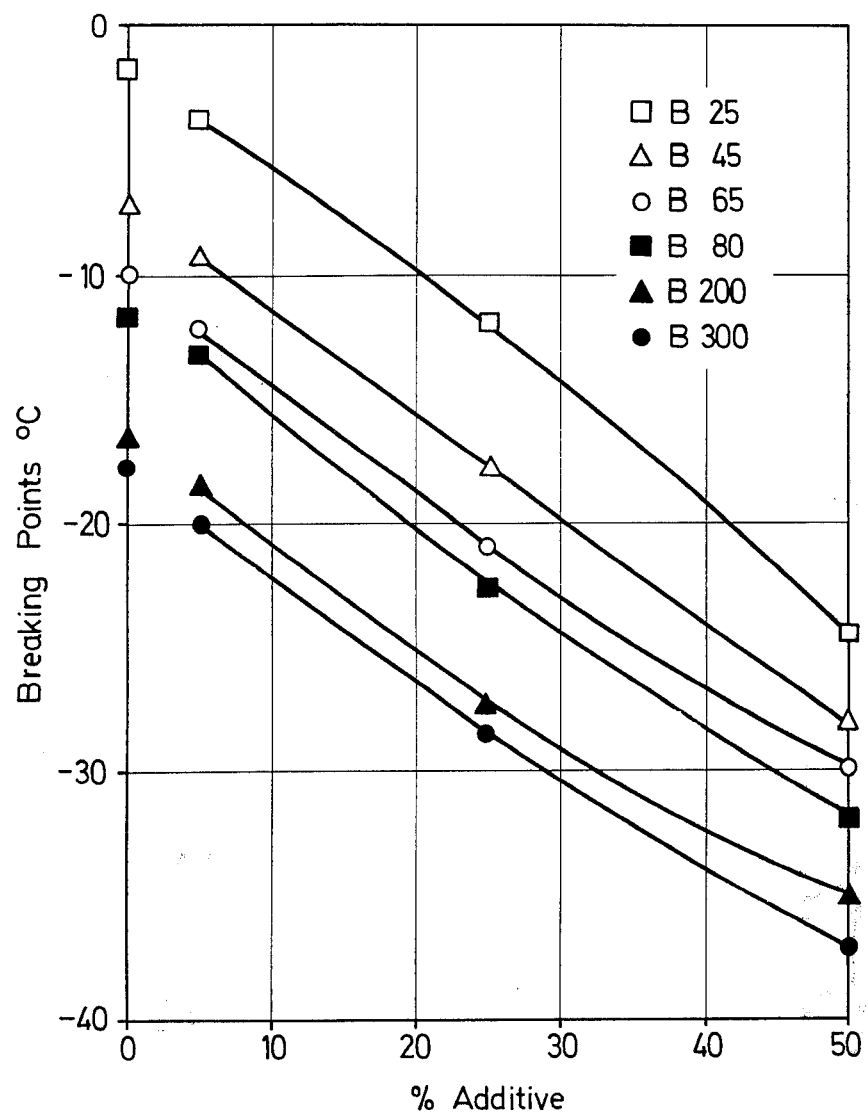
FIG. 3 is a graphical representation showing the improvement in the breaking points versus the percentage of additive for commercially available asphalts.
Figure 4:
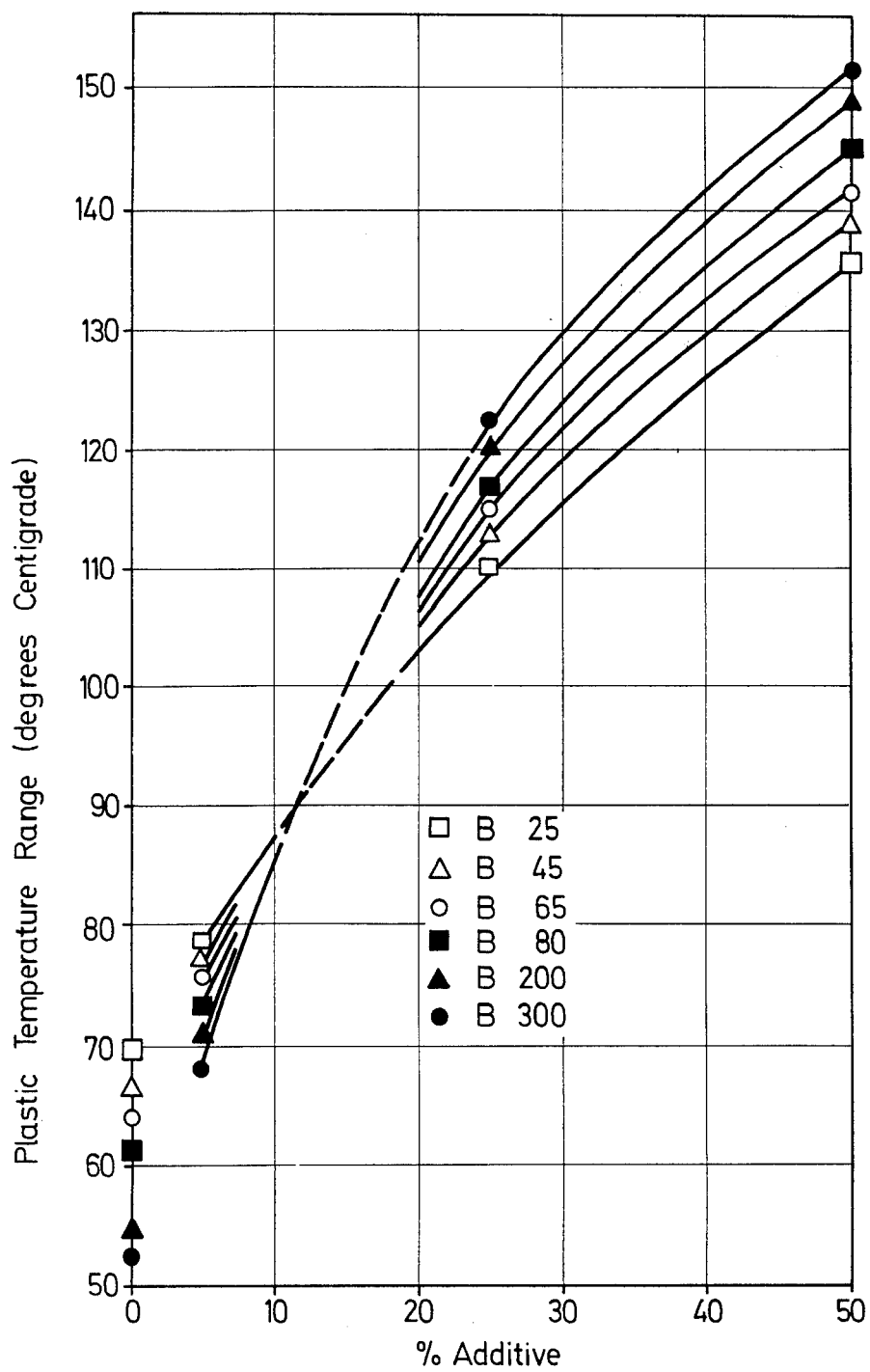
FIG. 4 is a graphical representation showing the widening of the plastic temperature range in degrees centigrade for percentage of additive for commercially available asphalt.

FIG. 3 shows the improvement in the breaking points. This improvement is, in all types of asphalt, about 0.5° per percent of addition of the above-mentioned polybutene. Consequently, it is possible to produce, with the aid of the soft asphalt types, mixtures having breaking points of up to about −35°C. Due to the improvements in the softening point and in the breaking point, the plastic temperature range (FIG. 4) is widened especially in those areas where it is especially necessary, in the case of the soft asphalts. In the latter, plastic temperature ranges are achieved which range higher than those of all types of asphalt; they amount to up to 150°; furthermore, they are especially advantageous since they are connected with very advantageous properties at low temperatures.

Figure 5:
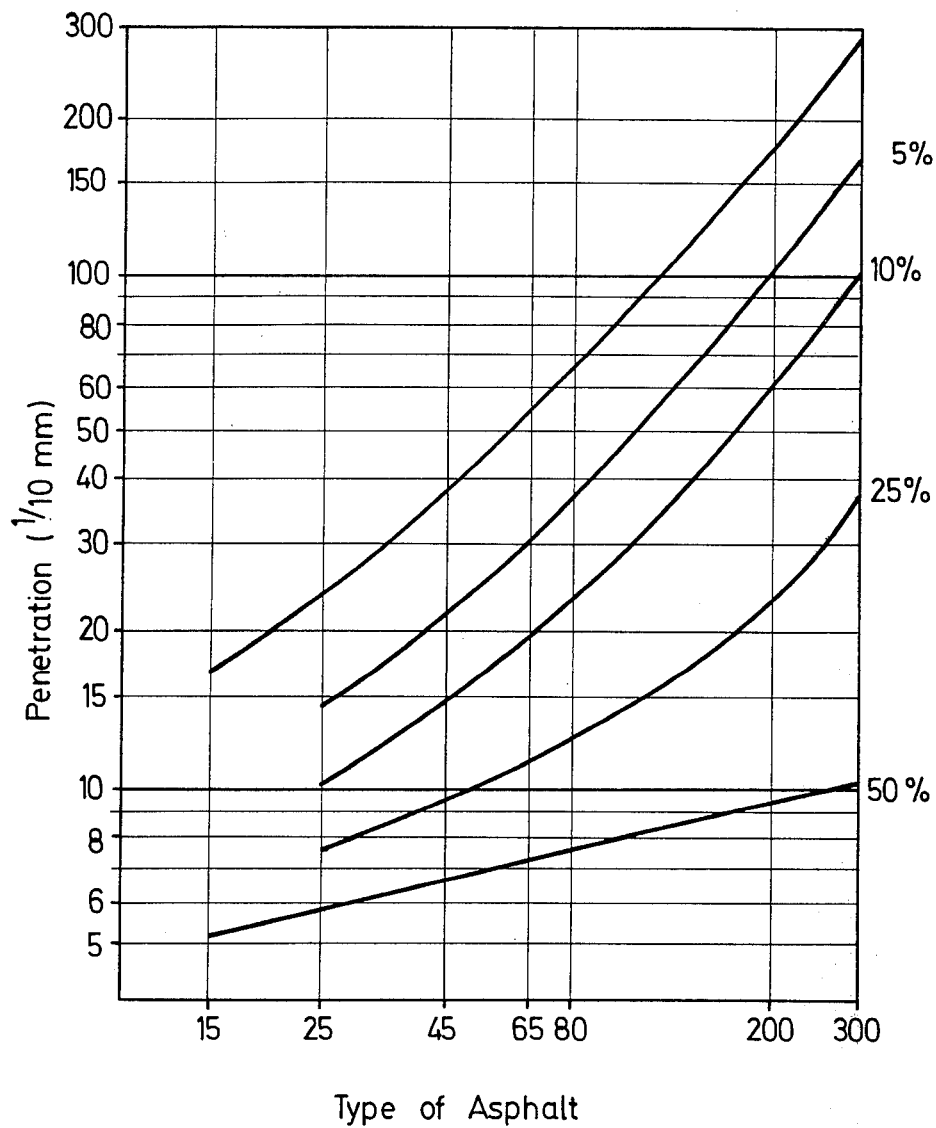
FIG. 5 is a graphical representation showing the penetration depth according to German Industrial Standard DIN 1995 versus the type of asphalt and the percentage of additive.

FIG. 5 shows the penetrations of the same mixtures. It can be seen therefrom that the penetration depth according to DIN 1995 vigorously declines particularly in the case of low amounts of additive of poly-1-butene and in the case of soft asphalts, i.e., the asphalts become more rigid with respect to low temperature deformation, flow processes or creep processes. In the case of harder asphalts, as well as when larger amounts are added, the decrease in penetration is less pronounced. This has the result that the differences among the various types are less marked than in the normal primary asphalts, so that deviations due to different asphalt origin and the like can be readily compensated for.

The greatest strengthening is effected by the addition of the high molecular, highly crystalline poly-1-butene types. Just as it is found after the melting of the unmixed polybutene, in the mixture a subsequent strengthening due to modification transformation is manifested, which wanes within a few days. Examples for the penetration values thus obtained are set forth in the Table:

| Type | Asphalt Parts | Polybutene Parts | Penetration After 3 Hours | 5 Days |
|---|---|---|---|---|
| B 300 | 100 | — | 245 | 230 |
| B 300 | 70 | 30 | 22 | 10 |
| B 300 | 55 | 45 | 7.5 | 2.6 |
| B 200 | 100 | — | 170 | 160 |
| B 200 | 94 | 6 | 85 | 65 |
| B 200 | 60 | 40 | 13 | 4.6 |

Figure 6:
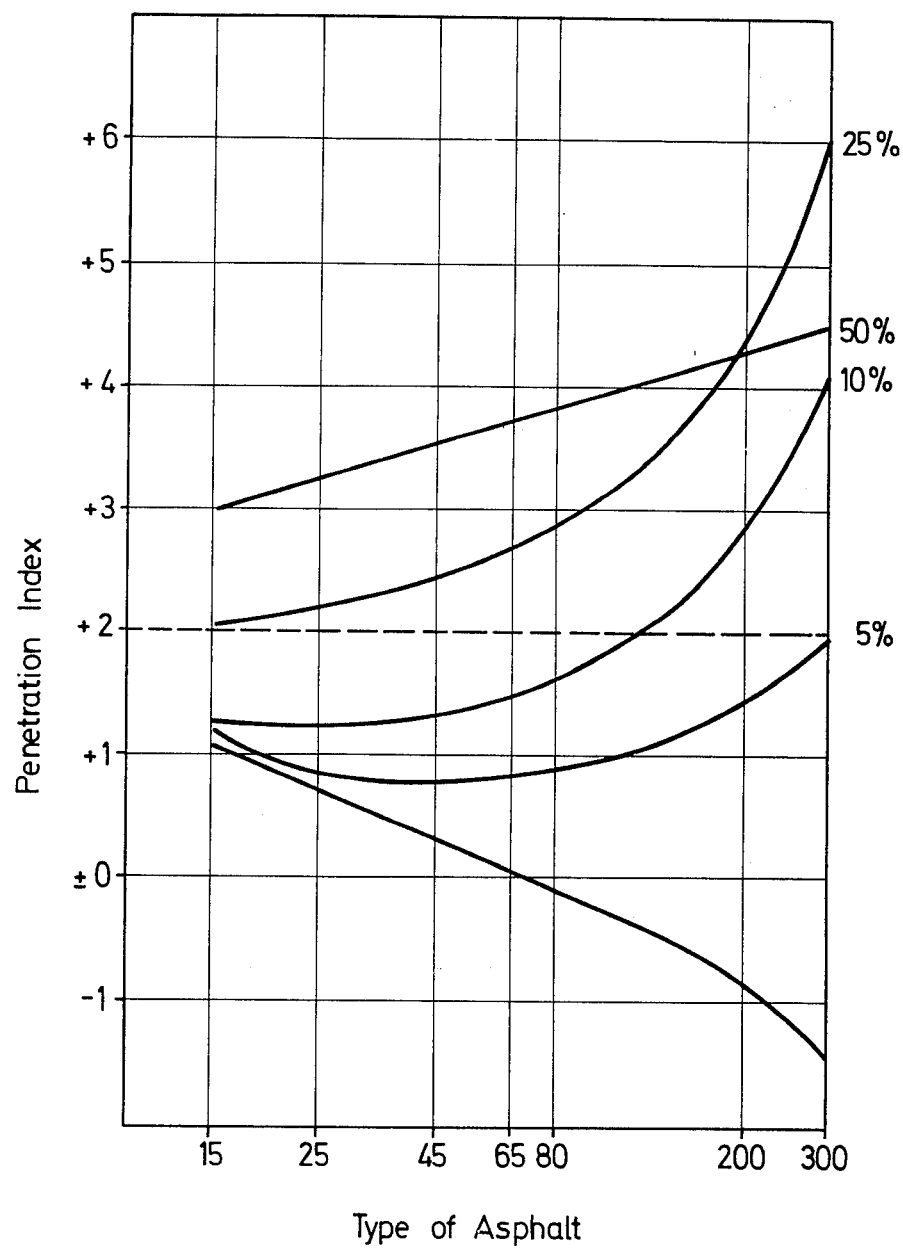
FIG. 6 is a graphical representation showing the penetration index versus the type of asphalt and the percentage of additive.

From improved softening points, in conjunction with the penetration, there results an improvement in the penetration index; (see FIG. 6). This improvement is particularly obvious in the case of B 300 where, with an addition of 25 percent of the above-described polybutene, a penetration index of above 6 is attained. The maximum for B 200, with an addition of about 35 percent, is 4.5; all other primary asphalts reach penetration indices of 3–4 with an addition of 40–50 percent. Thus, in all the above-mentioned types, the property characteristics of the blown asphalts are attained or considerably exceeded.

Figure 7:
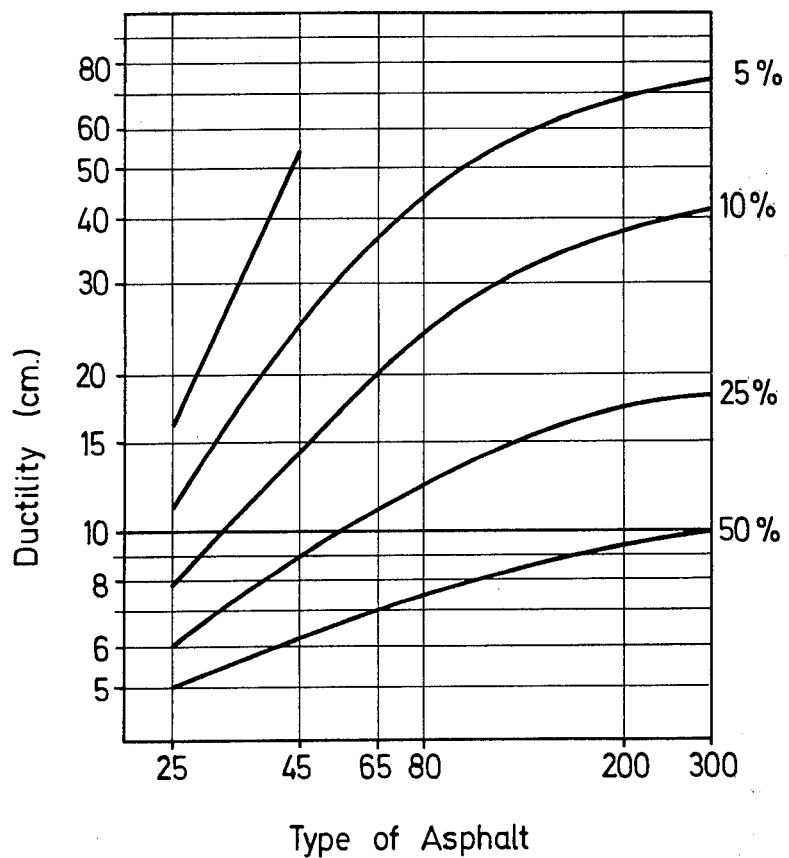
FIG. 7 is a graphical representation showing the ductility versus the type of asphalt and the percentage of additive.

The ductilities (FIG. 7) drop less strongly than the penetrations. This expresses itself in an increased energy absorbing property with respect to breaking processes. If a certain asphalt is "adjusted" in the softening point or in the penetration, the result—in addition to the greatly improved breaking point—is additionally an increased ductility. Particularly striking are the high ductility values in the case of the soft asphalts B 300, B 200, and B 80. For example, B 300, with 25 percent of polybutene, exhibits a softening point which is almost 30° higher than pure B 25, but it exhibits the same ductility. The breaking point is improved by about 25°, and the plastic temperature range is improved by 33°.

A grave objection to the use of polymers in asphalt is the increased processing viscosity or processing temperature. Many additives increase the viscosity of asphalt to such an extent that the customary processing or temperature conditions must be markedly varied. However, higher temperatures during transportation or processing impair the asphalt as well as the added polymer. For example, the viscosity of B 80 or B 45 increases already upon the addition of only 7.5 percent of ethylene acrylate (15 percent of the commercial mixture with bitumen) Bothäuser, K: "Die Modifizierung von Asphaltmassen fuer den Strassenbau" [The Modification of Asphalt Compositions for Road Construction], "Strasse und Autobahn" [Roads and Highways] (1969), pp. 293–299), to $1.0 \cdot 10^3$ or $4.0 \cdot 10^3$ centistokes, respectively, at 150°C. The commercial product—as a 50 percent batch—exhibits a viscosity of $7 \cdot 10^5$ centistokes.

Surprisingly, it was found that the viscosity of asphalt changed only to a relatively minor degree by the addition of polybutene, as can be seen from the Table. Increases in viscosity, as in the above-mentioned ester in 7.5 percent concentration, occur in this instance only at about 30 percent of added amount. In the case of additions of up to about 20 percent, the mixtures can still be satisfactorily compared with primary asphalt. For this reason, special measures, such as raising of the temperature, and the like, need be taken only to a minor extent during the processing. The increase in viscosity, over a wide range, is only dependent to a minor degree on the crystallinity and the molecular weight.

When adding 40–50 percent, the viscosity, with $1.0 - 1.5 \cdot 10^4$ centistokes, is similar to blown or high vacuum asphalt. Only in the case of the addition of highly crystalline, high molecular polybutene (0.5 percent ether-soluble, RSV = 3–6), the viscosities increase strongly.

| Asphalt | Poly-1-butene RSV | Ether-soluble | Ratio Polymer/Asphalt | Viscosity at 150°C (Centistokes) | Corresponding Type of Asphalt |
|---|---|---|---|---|---|
| B 300 | — | — | — | 90 | — |
| B 300 | 0.9 | 52 | 10/90 | 150 | B 200 – B 80 |
| B 200 | — | — | — | 110 | — |
| B 200 | 0.9 | 52 | 6/94 | 140 | B 200 – B 80 |
| B 200 | 0.9 | 52 | 10/90 | 180 | B 80 |

—Continued

| Asphalt | Poly-1-butene RSV | Ether-soluble | Ratio Polymer/Asphalt | Viscosity at 150°C (Centistokes) | Corresponding Type of Asphalt |
|---|---|---|---|---|---|
| B 200 | 0.9 | 52 | 20/80 | 700 | B 25 |
| B 80 | — | — | — | 190 | — |
| B 80 | 0.9 | 52 | 6/94 | 260 | B 65 |
| B 80 | 0.9 | 52 | 10/90 | 270 | B 65 |
| B 80 | Ethylene Acrylate | | 7.5/92.5 | 1000 | B 15 |
| B 45 | Ethylene Acrylate | | 7.5/92.5 | 4000 | B 85/25 |
| Commercial | Ethylene Acrylate | | 50/50 | 700000 | — |

The raw materials on which the values in the Table are based are commercially available asphalts and the above-mentioned polybutene type of an RSV of 0.9 and 52 percent ether-extractable substance. The comparative values for asphalts are taken from "Bitumen- und Asphalt-Taschenbuch" [Bitumen and Asphalt Handbook], publishers Bauverlag Wiesbaden (1964).

The mixtures of asphalt with poly-1-butene demonstrate, as compared to pure asphalt, an increased elasticity. This can be seen, for example, from measurements of the deformation elasticity according to DIN 53 514.

| Type of Asphalt | Deformation Elasticity (%) | Deformation Hardness (g.) |
|---|---|---|
| 75 parts B 200 and 25 parts Polybutene RSV = 0.9; 52 percent Ether Extract | 10 | 10,500 |
| B 75/30 | 9 | 4,600 |
| B 45 | 8 | 1,350 |

Normally, the deformation elasticity decreases in asphalts with increasing hardness. However, blow asphalts are somewhat more elastic than primary asphalts. The increase in elasticity to more than twice the amount with more than twice the hardness demonstrates herein a clearly increased elastic character.

Figure 8:
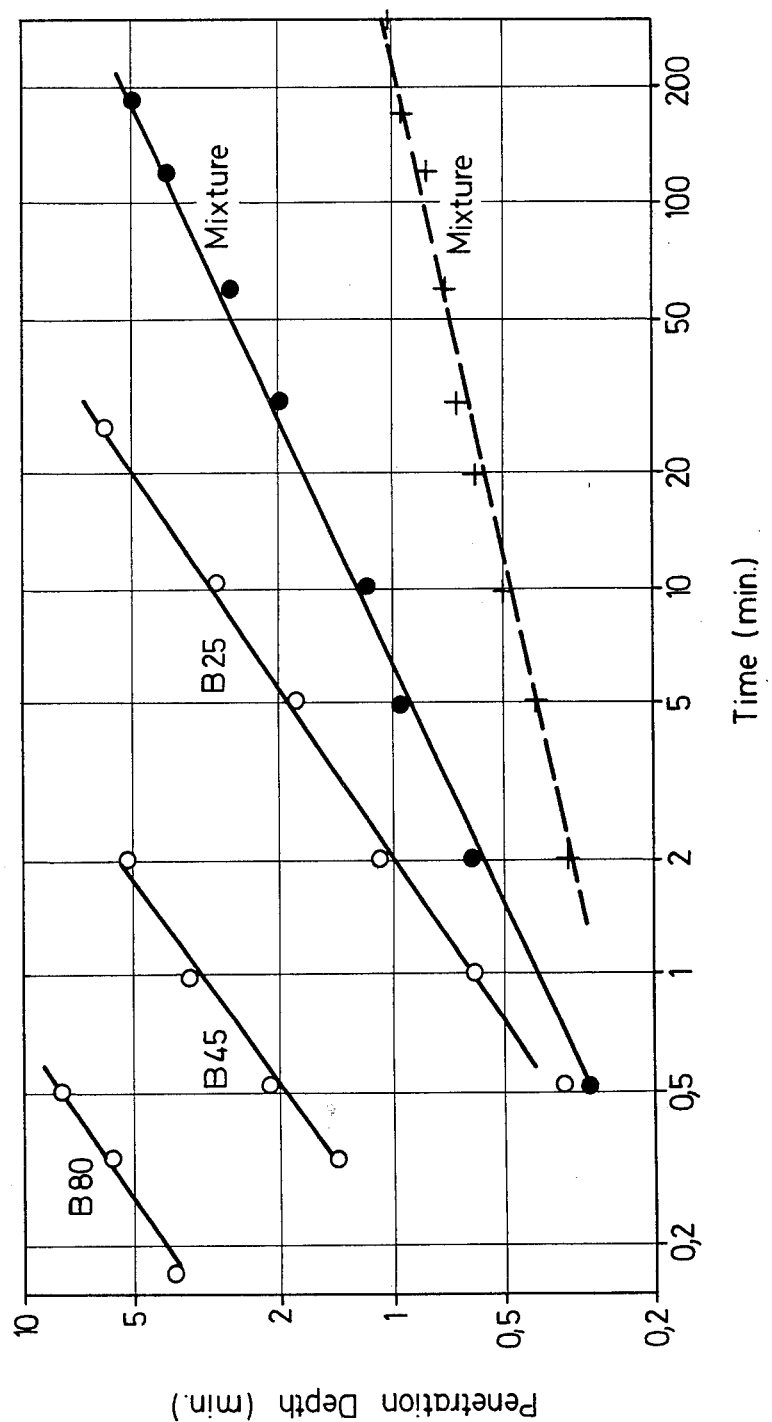
FIG. 8 is a graphical representation showing the change in penetration depth over a period of time on a double logarithmic scale for different types of asphalt.
Figure 9:
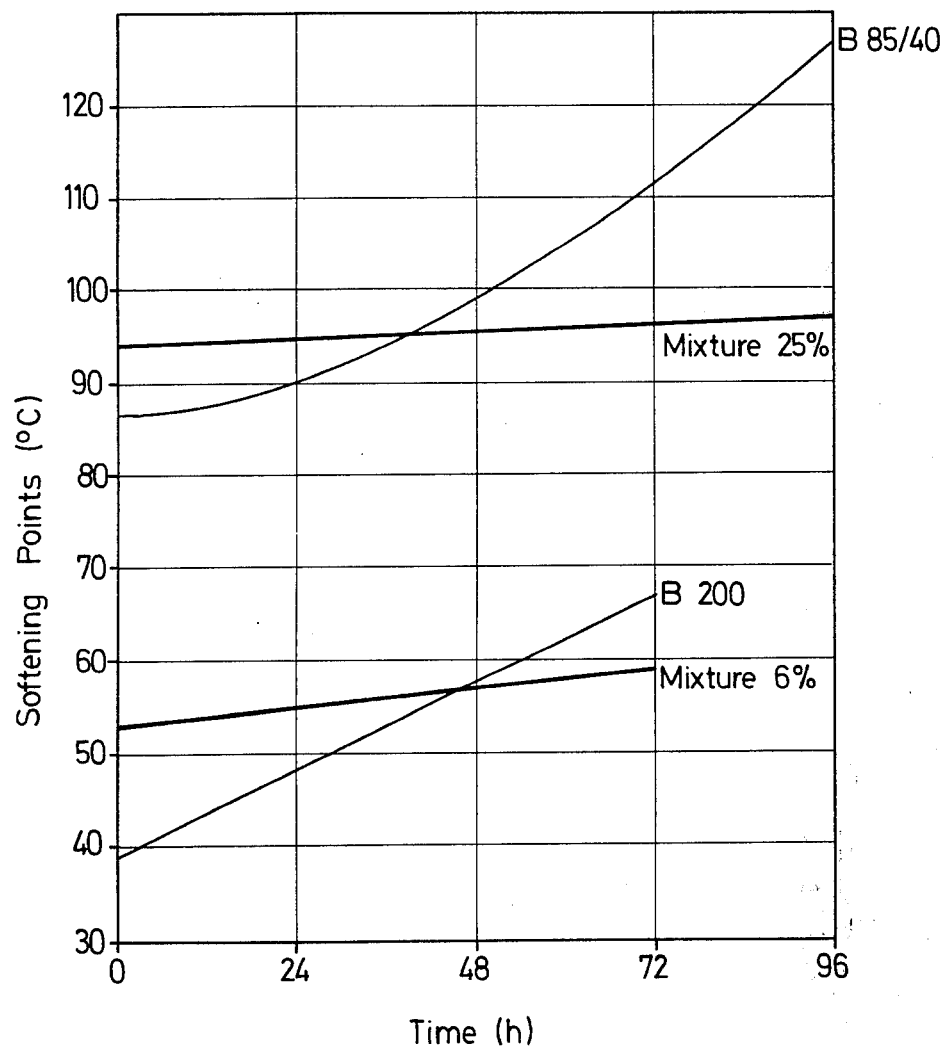
FIGS. 9 through 12 are graphical representations showing the results of storing commercial asphalts and mixtures with additives over a period of time.
Figure 10:
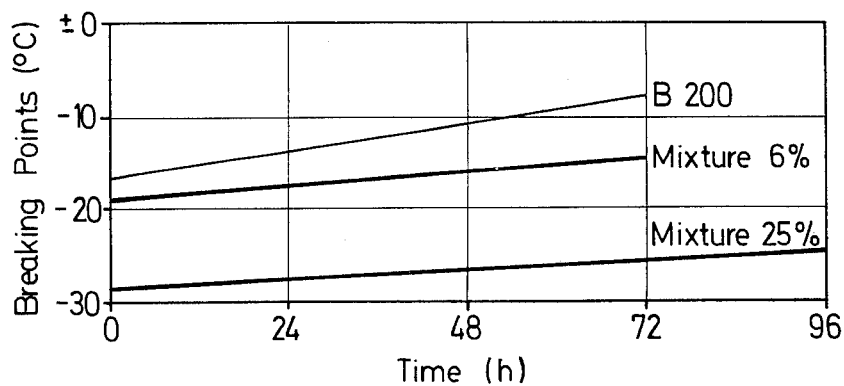

The asphalts mixed with poly-1-butene are considerably more resistant to deformations under constant static stress than the normal asphalts. In order to determine these deformations, the so-called "creep," plungers were employed in pentrometer in place of the customary needles, according to DIN 1995, so that the specific surface load is 0.5 kp./cm². In this stressing method, the penetration depth is observed over a longer period of time. The result can be seen from FIG. 8. On a double logarithmic scale, approximately parallel straight lines are obtained for primary asphalts. A mixture of 75 parts of B 200 and 25 parts of poly-1-butene with RSV = 3.5 and 75 percent ether extract deforms to a much lesser extent and the curve exhibits a substantially flatter characteristic, with an effect which is the more favorable, the longer the duration of stress. A mixture of 70 parts of B 300 and 30 parts of isotactic, high molecular polybutene (RSV = 6.0), however, is so resistant to creep (line in dashed representation) that a measurable deformation of 1 mm within 5 hours occurs only upon a stress of 2.0 kp./cm².

Similar improvements are also obtained in the flow behavior under practical conditions with an elevated temperature, as it occurs, for example, on strongly inclined roofs or on vertical walls. The flow occurs not only at a strongly increased temperature, but also, in a less sudden process, when the softening temperature has been reached.

Figure 11:
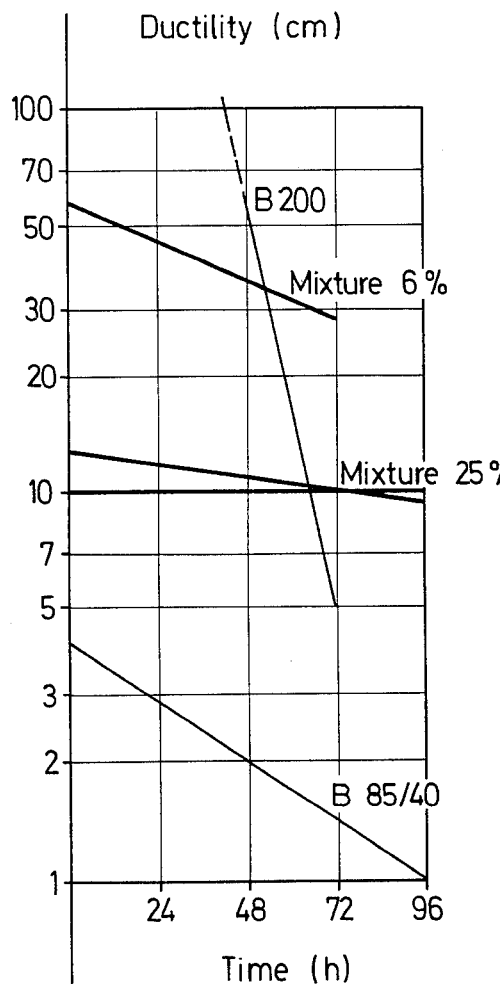
Figure 12:
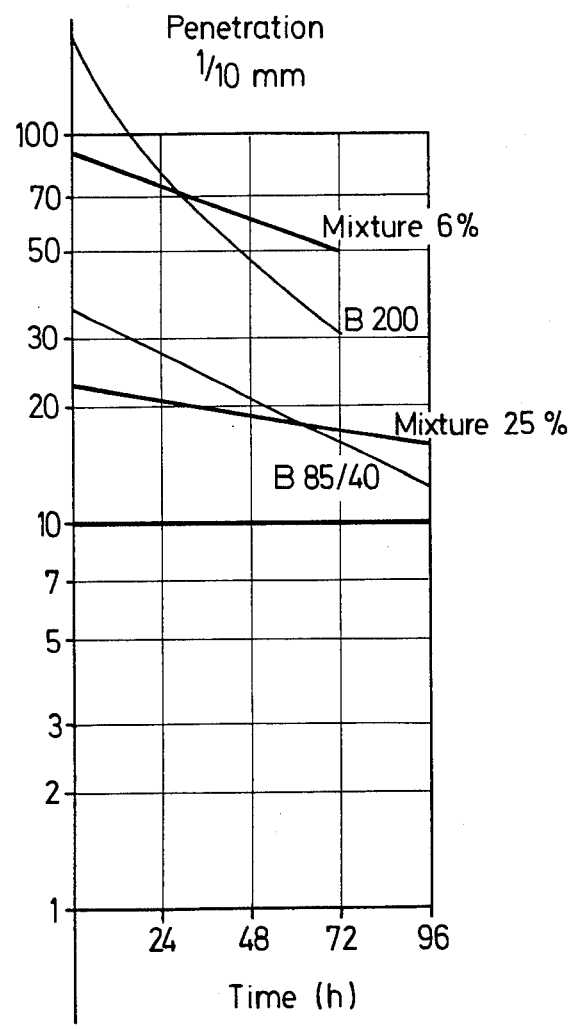

Furthermore surprising is the behavior of the novel mixtures during heat aging. Here, it would have been expected that the known, great change in the asphalt could not be stayed by a minor addition of a synthetic resin. However, this expectation does not hold true, surprisingly, in the case of poly-1-butene, for the polybutene already exerts a kind of protective effect on the asphalt already in small amounts, so that the properties of the mixtures during constant exposure to high temperatures remain astonishingly constant. In order to prove this effect, the mixtures can be stored, at a permanent temperature of 200°C which is extremely high for asphalt with access to air, in a heating chamber in open dishes for 72 hours. In FIGS. 9 through 12, the results of storing B 200; B 200 with an addition of 6 and 25 percent, respectively (based on 100 percent total mixture) of poly-1butene (RSV = 0.9; ether extract = 52 percent); and B 85/40 are illustrated. The softening points (FIG. 9) of B 200 and B 85/40 increase, after 3 and 4 days, respectively, by 30° and 40°, respectively, whereas the softening points of the 6 percent and 25 percent mixtures increase merely by 6° and 3°, respectively. The breaking point (FIG. 10) of B 200 increases, within 3 days, by 9°, that of the mixtures increases only by 2°. The hardness exhibits a similar behavior, represented by the penetration depth according to DIN 1995 (FIG. 12). The hardness of B 200 has risen, after 3 days, to 5.5 times the value, and that of the 6 percent mixture only to 1.8 times the value; in the same manner, the hardness of B 85/40 rose, within 4 days, to three times the value, and that of the 25 percent mixture to 1.4 times the value. The mixtures remain similarly stable with respect to their ductility (FIG. 11). In this illustration, it is shown that B 200 already drops by the factor 12 within 24 hours, whereas the 6 percent mixture drops, in 72 hours, only by the factor 2, and 25 percent mixture within 96 hours by the factor 1.4 and B 85/40 drops by the factor 4.

The weathering resistance is tested in the weathering simulators customary in plastics technology, with xenon burners with intermittent water sprays. (See ASTM E 42 for a weathering machine). After 500 hours of weather exposure, the specimens are judged by three observers independently of one another, giving marks from 1 – 6, in comparison with an unweathered sample.

| | |
|---|---|
| Evaluation mark | 1 = practically unchanged |
| " | 2 = little change |
| " | 3 = somewhat changed |
| " | 4 = markedly changed |
| " | 5 = strongly altered |
| " | 6 = very strongly altered |

The compositions of the specimens and the results have been compiled in the Table. Soft primary asphalts have not been tested since they run off under the testing conditions.

The thus tested primary asphalts and blown asphalts are strongly altered after 500 hours of exposure to weather. The ethyleneacrylate copolymer obtainable commercially exhibits a poor behavior and, moreover, bleeding out phenomena. The stability of mixtures with poly-1-butene becomes essentially better with increasing amounts of polybutene. The type of polybutene has only a minor influence thereon. Mixtures with soft primary asphalts are better than those having harder asphalts. In the following Table, results with polybutene of an RSV of 0.9 and 52 percent ether extract are illustrated.

tract (increasing crystallinity) and increasing RSV (molecular weight). The values refer to mixtures of 45 percent poly-1-butene and 55 percent asphalt B 200. In the case of isotactic poly-1-butene, the rule of thumb no longer applies.

| Property | Change in Properties With Decreasing Ether Extract | | With Increasing RSV | |
|---|---|---|---|---|
| | Tendency | Per 10% Ether Extract | Tendency | per 1 RSV |
| Softening point | rising | about 1°C | rising | about 2°C |
| Breaking point | rising | about 0.5°C | rising | 1–2°C |
| Penetration | falling | times 0.75 | falling | × 0.9 |
| Ductility | falling | times 0.9 | falling | × 0.9 |

The following Table contains individual values for mixtures of 45 percent poly-1-butene of various types and 55 percent asphalt B 200:

| Poly-1-butene | | Softening Point (ring and Ball) (°C) | Breaking Point (Fraass) (°C) | Penetration (1/10 mm) | Ductility (cm) |
|---|---|---|---|---|---|
| Ether Extract (%) | RSV | | | | |
| 5 | 3.7 | 120 | −27 | 2 | 5 |
| 28 | 3.8 | 118 | −27 | 4 | 5.5 |
| 40 | 3.5 | 117 | −29 | 6 | 7 |
| 52 | 0.9 | 112 | −34 | 9 | 10 |
| 64 | 0.6 | 106 | −32 | 15 | 13 |
| 75 | 1.0 | 107 | −32 | 17 | 13 |
| 75 | 3.5 | 110 | −29 | 14 | 9 |

The chemical resistance to solvents is considerably improved as compared to asphalt by the addition of poly-1-butene. With an increasing amount of polybutene, the resistance rises, and this also occurs with increasing molecular weight and increasing crystallinity.

| Type | Asphalt Amount (%) | Polybutene Amount(%) | Evaluation Weathering | Ozone |
|---|---|---|---|---|
| B 200 | 80 | 20 | 4.5 | 3–4 |
| B 200 | 60 | 40 | 2.3 | 2–3 |
| B 300 | 60 | 40 | 2.0 | 2–3 |
| B 80 | 60 | 40 | 2.2 | 2–3 |
| B 45 | 60 | 40 | 2.4 | 2–3 |
| B 15 | 60 | 40 | 2.5 | 2–3 |
| B 15 | 100 | — | 6.0 | 5 |
| B 85/40 | 100 | — | 6.0 | 5 |
| B 105/15 | 100 | — | 5.7 | 5–6 |
| Asphalt-Ethylene-Acrylate (Commercially Available) | | | 5.8 | 3–4 |

The resistance with respect to ozone was tested for 600 hours at 200 p.p.h.m. (parts per one-hundred million). The ozone cracks known from rubber occur in B 105/15. The other asphalts exhibit leathered surfaces, the copolymer has a hardened surface. The resistance of the mixtures with poly-1-butene increases with the poly-1-butene content. The testing conditions employed are extremely harsh. For practical use, the mixtures containing poly-1-butene are thus designated as very good.

The properties of the mixtures are altered with the composition of the polybutene. The Table indicates, according to a rule of thumb, the change in direction and magnitude occurring with a decreasing ether ex- Also the resistance to oxidizing agents increases. Thus, an asphalt B 85 when placed for 4 days at 23°C in 65 percent strength nitric acid, increases in weight, by oxidation, by 2.5 percent, whereas a mixture of 25 percent poly-1-butene and 75 percent B 200 merely increases in weight by 0.7 percent.

In their adhesive properties, the asphalts are slightly improved by the addition of poly-1-butene. Since the adhesion, in most of the cases where asphalts are employed, depends on the ability of the hot bitumens to penetrate into surface structures, this property is indirectly a viscosity problem, and the viscosity which increases only slightly has a very advantageous effect with respect to other polymer additives. By the addition of the polymer, a good adhesion to synthetic materials is likewise attained, particularly to polyolefins.

Due to their excellent and surprising properties, the compositions of this invention are suitable particularly for the uses described below as binders for the construction of road surfaces and as sealing films.

Road surfaces which can be produced, according to this invention, in an especially advantageous manner, are found particularly in road construction, in bridge surfacings, in airport runway construction, in industrial floors, and prefabricated asphalt tiles.

For road construction, the mixture with poly-1-butene can be effected, if necessary, during the manufacture of the asphalt of the refinery, since this mixture is thermally more stable than the basic asphalt. This results either in types having improved property spectra, or the addition of polybutene serves for obtaining the prescribed specifications. Also the production of higher concentrated types serving as a batch and being added to the final mixture prior to the use thereof, is possible.

The addition can also be effected in the storage tank at the mixing plant. Due to the advantageous solubility, the expenditure in agitating devices is minimal, and normally an agitator or a circulating pump are present anyway.

Suitably, the addition step is also conducted at the asphalt mixer. In the case of mixing plants for high quality asphaltic concrete, the mixture becomes homogeneous, when adding approximately fist-sized lumps, already within the customary mixing times for this plant, namely merely 30–60 seconds. In the case of adding smaller particles, the mixing time could, in principle, be even further reduced. When adding the predominantly crystalline, high molecular material of low solubility, the polybutene is well distributed during the mixing process due to the high shearing stresses, but the complete dissolution takes place during the first few minutes of transportation which is perforce required. The transportation temperatures of about 180°C, customary for high quality asphaltic concrete do not represent a critical thermal load for the mixture.

The higher heat stability of the asphaltic mixtures with polybutene renders these mixtures quite particularly suitable for withstanding the thermal conditions encountered in poured asphalt. During the processing of poured asphalt, the bituminous mass is, in most cases, maintained for hours at temperatures of 180°–240°C. These temperatures are not withstood by the customary polymer additives. In contrast thereto, poly-1-butene is not markedly impaired thereby and exerts a favorable influence on the aging stability of the asphalt.

Especially in poured asphalt, the addition of poly-1-butene is of advantage since the types of asphalt with high softening points are often utilized in this connection, such as B 45, B 25, and B 15, which have relatively high values with respect to the breaking point. By the addition of 5–10 percent polybutene—in extreme cases of up to 20 percent—a softer asphalt can be employed. The advantageous breaking point of this composition can be still further improved, the softening point is adjusted to the desired level by the additive, and the penetration is also adjusted to the desired type.

For asphalt mastic, the composition, for processing purposes, must be homogeneous and thinly fluid at temperatures of 160°–200°C. The thinly fuid phase can be especially readily achieved, due to the only minor increase in viscosity when adding polybutene, so that also in asphalt mastic the plastic temperature range can be widened by the addition of the polymer, which definitely is not the case in all additions of polymer; see FIG. 7.

Temporary roads must meet high requirements. They are often laid without a roadbase on wood and steel beams and must exhibit a high ductility. In this connection, soft asphalts can be used with the addition of 5 to about 30 percent polybutene, preferably between above 10 and 20 percent.

In the case of portable steel roads, the thin road surface is to be highly abrasion resistant. This surface often does not consist of asphalt, but of a layer of corundum applied with the use of plastic adhesives. Insofar as bituminous coverings are preferred, they should consist of a soft asphalt to which are added up to 50 parts of poly-1-butene.

Toppings for road bridges and turnpike bridges are under high stresses and are difficult to repair. They are produced advantageously with an addition of 5–10 percent of polybutene to 95–90 percent of asphalt; in special cases, up to about 20 percent of poly-1-butene is added.

Airport runway toppings must withstand the abrasion of landing commercial aircraft, the high surface pressure of parked airplanes, the heat of the propulsion gases of the engines, and, to a certain extent, must be resistant to the effects of jet fuel. All of these required properties are enhanced by the addition of polybutene. Suitably, 5–20 percent is utilized. Elongation cracks in roads, bridges, and airport runways are suitably provided with a bituminous mixture containing poly-1-butene of low crystallinity, but of high molecular characteristic.

Industrial floors are, in certain cases, under such a high stress by fork lift trucks that it is necessary to lay polyester concrete or epoxy concrete in place of bituminous coverings. In this instance, asphalts can be improved depending on the particular requirements by the addition of poly-1-butene. Little stressed floors contain about 5 percent poly-1-butene, whereas floors under very high loads contain up to 50 percent, based on the binder.

Similar possibilities exist in connection with prefabricated asphalt tiles; depending on the requirements, the addition of polybutene can range between 5 and 50 percent. With an increase in the thickness, the vibration-absorption capability of such prefabricated blocks, which are produced by the casting method, increases likewise. Therefore, very thick tiles and blocks are additionally suitable, for example, as vibration-damping machine foundations. They contain advantageously more than 20 percent of poly-1-butene, with a maximum of approximately 50 percent, based on the binder. In contrast to other compositions—such as ethylene-acrylate—these compositions can be processed by the casting method; their surfaces are not tacky. In case higher requirements must be met regarding the rigidity, 30–50 parts of isotactic polybutene having a high molecular weight are suitably utilized with 70–50 parts of asphalt. However, in this instance, higher processing temperatures are required.

Furthermore, the compositions are particularly suitable for the production of sealing films of all types, for example roof and insulating films or boards, especially also in the hydraulic, dam, or tunnel construction fields.

Films can be produced from 20–50 percent polybutene and 80–50 percent asphalt. Suitably, a soft asphalt is used. If rigidity and tensile strength are to be increased, 30–50 percent isotactic, high molecular poly-1-butene is used. These films can be employed as roofing and insulating films. For earth, dike, and tunnel construction, it is also suitable to employ films or plates of a greater thickness. The insertion of fabrics, the incorporation of fillers and reinforcing substances, as well as the covering with synthetic resin coatings are possible in a conventional manner.

Thus, the films can also be reinforced, for example, with glass fibers or cardboard. Such bituminous cardboards must be resistant to bending even at low temperatures and their cover coating must not run off at high temperatures. Furthermore, they should be weather resistant. These requirements can nowadays be met only with a soft impregnating layer, a blown asphalt as the cover layer, and gravel as weather-protective covering. Mixtures of soft asphalt with poly-1-butene are resistant to impact rupture at low temperatures, resistant to high temperatures, and weather resistant, and they can take over all of the required functions with a proportion of 5–20 percent in the binder.

In the water, dike, and tunnel construction, it is also possible to employ, in addition to foils and sheets, bituminous compositions with an addition of poly-1-butene, in place of the compositions utilized heretofore. The compositions also combine in this case low breaking points with high softening points. For tunnel construction, a satisfactory ductility as an additional advantageous property, and for hydraulic engineering, the required weather resistance are provided.

The films can also be reinforced by paper inserts. Such papers are employed as impregnated papers in the cable industry, with soft asphalts as unilaterally coated papers with very hard, grippable asphalts, as laminated papers with blown asphalts, and as pulp-glued papers with asphalt emulsions.

In the cable industry, the asphalts can be kept supple by the addition of poly-1-butene having a high ether extract of 40–80 percent. The chain length is less decisive in this connection and can range between RSV = 0.4 and 5.0. Unilaterally coated papers are still pliant merely because of the minor thickness of the asphalt layers. A higher flexibility can be attained by adjusting the softening point to be obtained by a somewhat softer asphalt having an addition of poly-1-butene of 5–20 percent. Suitably, the ether-soluble proportion should not exceed 60 percent in this connection, since otherwise the papers become tacky at a higher temperature of use. The chain length can range between RSV = 0.4 and 4.0.

The laminating of papers is critical especially in those cases where, because of the insertion of jute fabrics or in conjunction with creped paper, the asphalt layer—which ranges normally from 40 to 50 g./m²—increases to values of 150 g./m² and thereabove. At this layer thickness, it is necessary to employ especially blown asphalts or even special mixtures of asphalt, fatty acid pitches, or fatty oils, in order to satisfy the requirements regarding low and high temperatures, without rupturing during use or during coiling.

The mixtures of this invention are more pliant than the asphalts employed heretofore and yet exhibit a wider plastic temperature range. Suitably, 5–20 percent is used of types having an ether extract of 40–70 percent and an RSV of 0.5 to 3.5.

EXAMPLE 1

Asphalt B 200 is heated with poly-1-butene, RSV = 0.9; 52 percent ether extract, in pieces of about 0.1 g. in weight, in a thickwalled beaker ("chlorinating pot") within about 10 minutes to 170°C. The composition is agitated for another 5 minutes by means of an impeller agitator. The total amount of the mixtures is, in each case, 400 g., the concentration of poly-1-butene is, respectively, 6; 10; 20; 25; 45; and 50 percent. The property characteristics of the mixtures are represented in FIGS. 2–7.

EXAMPLE 2

Under the conditions of Example 1, mixtures are produced with B 300; B 80; B 65; B 45; and B 15 with, respectively, 6; 10; 25; and 50 percent poly-1-butene. In case of B 25 and B 15, the temperature is increased to 180°C. The properties are represented in FIGS. 2–7.

EXAMPLE 3

In order to determine the time and temperature required for a homogeneous dissolution, the experiments of Examples 1 and 2 are repeated and supplemented by other asphalts. In this connection, the agitation is conducted by hand with the aid of the thermometer in order to be able to continuously observe the melt. The experimental amounts are, respectively, 100 g. The asphalt is heated in an enameled steel container within 5–10 minutes to the temperature set forth in the Table. The polybutene is added in one bath in pieces of about 0.1 g. (type 952 meaning RSV = 0.9; ether extract = 52 percent) and 0.5 g. (type 665 meaning RSV = 0.6; ether extract = 65 percent), is stirred by hand. The amount is, in all cases, 6 percent. At the below-indicated temperature, the poly-1-butene is dissolved within 5 minutes.

EXAMPLE 3/TABLE

| Type of Asphalt | Type of polybutene | Temperature (°C) |
|---|---|---|
| B 300 to B 15 | 952 | 160 |
| B 75/30; 105/15; 115/15 | 952 | 170 |
| B 135/10 | 952 | 180 |
| HVB 85/95; 95/105 | 665 | 160 |
| HVB 130/140 | 665 | 180 |

EXAMPLE 4

In order to determine the dependence of the dissolving rate on the molecular weight and the ether extract, dissolution experiments are conducted with the experimental arrangement of Example 3, but at a constant temperature of 160°C, with respectively 94 g. of B 200 and 6 g. of poly-1-butene of about 30 different types. The results are represented in FIG. 1 as "curves of identical dissolving times."

EXAMPLE 5

Respectively 90 g. of asphalt B 300 is heated to 190°C in the experimental arrangement of Example 3; respectively 10 g. of poly-1-butene of the composition disclosed in the Table below is added, and the mixture is agitated until homogeneity is achieved. The values of the mixtures according to DIN 1995 are set forth in the Table.

| Polybutene Isotactic (g.) | Polybutene Type 665 (g.) | Softening point (°C) | Breaking Point (°C) | Penetration (1/10 mm) |
| --- | --- | --- | --- | --- |
| — | 10 | 52 | −26 | 100 |
| 2 | 8 | 55 | −25 | 85 |
| 4 | 6 | 61 | −23 | 70 |

EXAMPLE 5 a

In a masticator, type Brabender plastograph, capacity about 30 cc., asphalt B 200 and copolymers of polybutene are heated, in the amounts indicated below and in the composition likewise set forth below, to about 150°C and masticated for 1 hour. Softening and breaking points are indicated in accordance with DIN 1995.

| Amount of Asphalt (g.) | Copolymer RSV | Copolymer Ether Extract (%) | Comonomer: Type | Comonomer: Amount (%) | Amount (g.) | Softening point (°C) | Breaking Point (°C) |
| --- | --- | --- | --- | --- | --- | --- | --- |
| 24 | 7.0 | 9 | Dodecene Propene | 2.5 6.5 | 6 | 108 | −27 |
| 22.5 | 7.0 | 9 | Dodecene Propene | 2.5 6.5 | 7.5 | 112 | below −40 |
| 18 | 7.0 | 9 | Dodecene Propene | 2.5 6.5 | 12 | 118 | below −40 |
| 24 | 4.0 | 70 | Propene | 15 | 6 | 105 | −30 |

EXAMPLE 6

90 g. of pulverized, high molecular isotactic poly-1-butene, RSV = 6.4; 0.8 percent ether extract, tensile strength 206 kp/cm$^2$, tenacity 314 kp/cm$^2$, tensile elongation 188 percent, is mixed with 110 g. of B 300, heated to 50°C, in small portions, and agitated to dryness in each case. The thus-obtained pourable powder is pressed in a mold at 200°C under a pressure of 0.1 kp/cm$^2$ to plate within 30 minutes. The mixture has the following data:

| | |
| --- | --- |
| Softening point, ring and ball (°C) | 182 |
| Breaking point (°C) | −39 |
| Penetration (1/10 mm) | 2.6 |

All properties have been determined after 5 days of storage.

EXAMPLE 7

30 g. of pulverized, high molecular isotactic poly-1-butene, RSV = 7.8, 1.7 percent ether extract, tensile strength 202 kp/cm$^2$, tenacity 326 kp/cm$^2$, tensile elongation 210 percent, is stirred together, in the cold state, with a solution of 35 g. of B 300 and 20 g. of n-octane. The thus-produced composition is stored for 3 hours at 120°C and then press-molded as set forth in Example 6. The mixture has the following data:

| | |
| --- | --- |
| Softening point, ring and ball (°C) | 177 |
| Breaking point (°C) | −41 |
| Penetration (1/10 mm) | 3.2 |

All properties have been determined after 5 days of storage.

EXAMPLE 8

Under the conditions of Example 7, a mixture is produced from 70 g. of B 300, 30 of high molecular isotactic polybutene, RSV = 4.7; 0.9 percent ether extract, tensile strength 212 kp/cm$^2$, tenacity 286 kp/cm$^2$, tensile elongation 197 percent; and 30 g. of octane. The mixture is heated to 160°C; thereafter, during the course of 20 minutes, 15 g. of polybutene, RSV = 0.6 and ether extract 65 percent is stirred into this mixture until homogeneity is achieved. The mixture exhibits the following data, measured after 5 days of storage:

| | |
| --- | --- |
| Softening point, ring and ball (°C) | 140 |
| Breaking point (°C) | −37 |
| Penetration (1/10 mm) | 7 |

EXAMPLE 9

In the experimental arrangement of Example 3, various synthetic resin or rubber products are added under the conditions set forth in the Table with respect to time, temperature, and amounts. At 170°C, the amounts and types of poly-1-butene set forth in the Table are added thereto, and the mixture is agitated for 10 minutes. The properties are set forth in the Table below:

| Asphalt Type | Asphalt Amount (g.) | Additive Type | Additive Amount (g.) | Temp. (°C) | Agitation Time (min.) | polybutene Type | polybutene Amount (g.) | Softening Point (°C) | Breaking Point (°c) | Penetration (1/10 mm) |
| --- | --- | --- | --- | --- | --- | --- | --- | --- | --- | --- |
| B 200 | 89 | PE Soft | 5 | 190 | 15 | isotactic | 6 | 68 | −22 | 35 |
| B 300 | 85 | PP atactic | 5 | 180 | 30 | 952 | 10 | 72 | −25 | 58 |
| B 80 | 80 | NK Powder* | 5 | 180 | 20 | 952 | 15 | 85 | −19 | 18 |
| B 200 | 70 | SBR rubber (as latex) | 4 | 100 170 | 30 | 3570 | 26 | 96 | −29 | 20 |
| B 80 | 30 | Ethylene-acrylate and bitumen** | 25 | 200 | 60 | 665 | 45 | 124 | −34 | 6 |

*Commercial name: "Pulvatex", contains 40 percent filler
**Commercial name: "Lucobit"

EXAMPLE 10

A 10 percent mixture of poly-1-butene is produced in the following manner; 10 kg. of poly-1-butene type 3570 (RSV = 3.5; 70 percent ether extract) is homogenized in four batches in a 5 liter masticator (manufacturer: Meili, type 5 LNS) with 10 kg. of B 80 at 180°C masticator temperature within respectively 20 minutes (masticator and asphalt were preheated). Of this mass, 18 kg. is introduced into an asphalt boiler to 72 kg. of B 80 and mixed together by agitation at about 180°C to a homogeneous mixture within about 10 minutes.

The composition exhibits a softening point of 73°C, a breaking point of −16°C, and a penetration of 25 1/10 mm.

EXAMPLE 11

In a continuous mixing plant, respectively 10 tons of high grade asphalt concrete is produced from respectively 630 kg. of binder and respectively 9370 kg. of mineral mass. The mixing temperatures are approximately 200°C, the mixing times are 40 seconds when pure asphalt is added, 80 seconds when asphalt and polybutene are added. Polybutene having an RSV of 0.9 and 52 percent ether extract is added in fist-sized lumps and is homogeneously distributed within the mixing times. The three ten-ton charges are transported, as is customary in road construction, to the building site and are maintained until use for 4–5 hours at above 160°C.

The building step is conducted with a ready-mixer of the type Voegele, Super 150. Between the individual mixing processes, no difference is detected in building the road surface. During compacting with the roll, a satisfactory compression is obtained the more rapidly, the larger the amount of polybutene added. During building, samples are drawn, and the following values are obtained therefrom: (Marshall Test is disclosed in U.S. Pat. Nos. 3,070,557 and 3,070,568).

| Amount of Polybutene % in the Binder | Softening point (ring and ball)°C | Marshall Test Stability (kg) | Marshall Test Creep Value (1/10 mm) |
|---|---|---|---|
| 0 | 50 | 610 | 38 |
| 6 | 60 | 730 | 56 |
| 12 | 69 | 800 | 66 |

EXAMPLE 12

In a continuous mixing plant, respectively 1 ton of pouring asphalt is produced, as set forth in the Table, and applied along a test area. The mixing temperatures are about 220°C. The mixture is first produced as usual in 40 second, then the isotactic polybutene is added in the form of a powder, and the atactic polybutene is added in fist-sized pieces and again mixed for 60 seconds. The application takes place after about 3 hours of transporting and storage. The starting asphalts are B 45, B 65, B 80 and B 200.

| | Asphalt | | Polybutene | | Softening point (ring and ball) (°C) | Deformation Cubes (1000 kp. load) | (mm) in Prisms (100 kp. load) |
|---|---|---|---|---|---|---|---|
| Type | Amount (kg) | Isotactic (kg) | Type | Amount (kg) | | | |
| B 45 | 75 | — | — | — | 60 | 2.7 | 4.1 |
| B 45 | 70.5 | 1.5 | 3570 | 3.0 | 74 | 1.6 | 3.0 |
| B 65 | 69 | 2 | 952 | 4.0 | 75 | 1.7 | 2.9 |
| B 80 | 67 | 3 | 665 | 5.0 | 78 | 1.4 | 2.8 |
| B 200 | 69 | 2 | 952 | 4.0 | 66 | 2.3 | 3.5 |
| B 200 | 67 | 3 | 952 | 5.0 | 70 | 2.0 | 3.2 |

The amounts missing to 1,000 kg. in weight are proportions of rocks. The softening points were measured on the binder.

EXAMPLE 13

Roofing boards are produced (a) with primary asphalt and blown asphalt; (b) and (c) with various primary asphalts with the addition of poly-1-butene. Strips of 0.333 kg. raw felt cardboard with a length of 50 cm. and a width of 10 cm. are saturated in impregnating asphalt of a temperature of 200°C and are squeezed between two rolls preheated in a heating chamber. The thus-obtained crude felt boards are dipped into the covering asphalt which likewise has a temperature of 200°C and are then squeezed as set out above. The composition and properties are set forth in the Table. The atactic polybutene has an RSV = 3.5 and 70 percent ether extract, the cover compositions contain additionally respectively 1 kg. of ground slate.

The specimens are examined according to DIN 52 123. The low temperature resistance is examined by means of a flexing plate 25. In a deviation from the standard procedure, the temperatures are varied in the upward and downward directions in such a manner that flow-off and rupture, respectively, occurs. The weatherability is tested in the xenon test apparatus 450 of the firm Heraeus, Hanau. This property corresponds to the cover compositions employed.

bad = blown asphalt
very good = primary asphalt

| Impregnating Asphalt | | | Cover Composition | | | | High Temperature Stability (°C) | Low Temperature Resistance (°C) | Weatherability (°C) |
|---|---|---|---|---|---|---|---|---|---|
| Bitumen Type | Polybutene (g.) | | Bitumen Type | (g.) | Polybutene Isotac. (g.) | Atact. (g.) | | | |
| B 200 | 2000 | — | B 75/30 | 2000 | — | — | 73 | −14 | bad |
| B 300 | 1880 | 120 | B 80 | 1800 | — | 180 | 75 | −18 | very good |
| B 300 | 1890 | 110 | B 200 | 1750 | — | 250 | 72 | −24 | very good |
| B 300 | 1880 | 120 | B 300 | 1750 | 100 | 150 | 73 | −26 | very good |

EXAMPLE 14

In a mixing mechanism similar to that of Example 12, respectively 1 ton of pouring asphalt is produced at 240°C and applied in the form of industrial floors for fork lift truck operations. The properties are set forth in the Table.

| Asphalt | | | Polybutene | | Softening point (ring & ball) °C | Deformation (mm) in | |
|---|---|---|---|---|---|---|---|
| Type | Amount (kg.) | Isotactic (kg.) | Type | Amount (kg.) | | Cubes 1000 kp. load | Prisms 100 kp. load |
| B 45 | 50 | — | 665 | 40 | 105 | 0.3 | 0.5 |
| B 80 | 55 | 5 | 3570 | 40 | 112 | 0.3 | 0.6 |
| B 80 | 50 | — | 952 | 45 | 110 | 0.3 | 0.7 |
| B 200 | 80 | 40 | — | — | 145 | 0.2 | 0.3 |
| B 45 | 52 | 48 | — | — | 170 | 0.1 | 0.2 |

The amount missing to 1,000 kg. is represented by rock proportions. The softening points were measured on the binder.

EXAMPLE 15

In the masticator of Example 10, 2 kg. of asphalt B 200 is heated to 180°C. To this is added 1.8 kg. of poly-1-butene, RSV = 0.8, ether extract = 65 percent; the reaction mixture is heated under mastication until the entire mass reaches 180°C. Thereafter, 3 kg. of ground slate are admixed thereto until the mixture is homogeneous. The thus-obtained composition is shaped, at 13-0°C, in a platen press, to a sheet having a thickness of 2 mm. The properties of this sheet are as follows:
Tensile strength: 60 kp/cm²
Tensile elongation: 380 percent

EXAMPLE 16

A roofing sheet is produced in the following manner: 5 kg. of pulverized, high molecular isotactic poly-1-butene, RSV = 6.4; 0.8 percent ether extract, is heated to 70°C in an enameled steel pot on a heating plate. Asphalt 200, likewise heated to about 70°C, is added thereto in a total amount of 6 kg., in approximately 1 kg. charges, and the mixture is stirred to dryness by means of a wooden spatula. 3 kg. of rock flour and 0.5 kg. of carbon black are mixed thereto by hand while the mixture is cooling, so that a homogeneous composition is obtained. The composition then becomes pourable. On a platen press, a sheet of a thickness of 2.5 mm. is produced therefrom at 200°C. The properties of this sheet are as follows:
Tensile strength: 140 kp/cm²
Tensile elongation: 130 percent

We claim:

1. A process for preparing a thermoplastic composition comprising about 50–95 percent by weight of asphalt and about 5–50 percent by weight of poly-1-butene dissolved therein, said asphalt having a softening point of between about 25°–90°C with a penetration depth of between about 350 and 10 tenths of a mm as measured by German Industrial Standard 1995, and said poly-1-butene having a specific gravity of between about 0.85 – 0.92, an ether extractable proportion of between about 0 and 85, and a molecular weight of between about 50,000 and 4,000,000 wherein said poly-1-butene in a powder form is distributed uniformly with said asphalt in a slurry at a temperature of below 100°C, adding a solvent to said slurry to lower the temperature of solution of said poly-1-butene, and the slurry is heated above the solution point of said poly-1-butene to form said thermoplastic composition.

2. A process for coating a base material with a thermoplastic composition of about 50–95 percent by weight of asphalt and about 5–50 percent by weight of poly-1-butene comprising:
   a. reducing said poly-1-butene having a specific gravity of between about 0.85 – 0.92, an ether extractable proportion of between about 0 and 85, and a molecular weight of between about 50,000 and 4,000,000 to a powder;
   b. distributing said powder uniformly in said asphalt having a softening point of between about 25°–95°C with a penetration depth of between about 350 and 10 tenths of a mm as measured by German Industrial Standard 1995 at a temperature between about 25° and 100°C to form a slurry, adding a solvent to said slurry to lower the temperature of solution of said poly-1-butene;
   c. heating said slurry and thereby dissolving said poly-1-butene in said asphalt to form said thermoplastic composition; and
   d. applying said thermoplastic composition to said base material.

3. The process of claim 2, wherein said base material is selected from the group consisting of road beds, steel roads, bridges, airport runway surfaces and industrial floors.

4. The process of claim 1, further comprising forming molded asphalt sheets of said composition.

5. The process of claim 1, wherein said poly-1-butene is 20–50 percent by weight and said composition is formed into molded articles selected from the group consisting of films and plates.

* * * * *